(12) United States Patent
Choi

(10) Patent No.: US 9,074,682 B2
(45) Date of Patent: Jul. 7, 2015

(54) ASYMMETRIC ELLIPTICAL CHAIN GEAR FOR A BICYCLE

(76) Inventor: Yun Seok Choi, Daegu (KR)

( * ) Notice: Subject to any disclaimer, the term of this patent is extended or adjusted under 35 U.S.C. 154(b) by 0 days.

(21) Appl. No.: 14/240,414

(22) PCT Filed: Aug. 21, 2012

(86) PCT No.: PCT/KR2012/006634
§ 371 (c)(1),
(2), (4) Date: Feb. 24, 2014

(87) PCT Pub. No.: WO2013/027996
PCT Pub. Date: Feb. 28, 2013

(65) Prior Publication Data
US 2014/0221139 A1 Aug. 7, 2014

(30) Foreign Application Priority Data
Aug. 23, 2011 (KR) .......................... 10-2011-0083899

(51) Int. Cl.
*F16H 55/30* (2006.01)
*F16H 55/36* (2006.01)
(Continued)

(52) U.S. Cl.
CPC .................. *F16H 55/30* (2013.01); *B62M 9/08* (2013.01); *B62M 3/06* (2013.01)

(58) Field of Classification Search
CPC .................. F16H 2035/003; B62M 2009/002; B62M 9/08; F01L 2810/03; F02B 67/06
USPC .......................................................... 474/141
See application file for complete search history.

(56) References Cited

U.S. PATENT DOCUMENTS 515,449 A * 2/1894 Scovell .......................... 474/141
3,583,250 A * 6/1971 Kongelka ...................... 474/133
(Continued)

FOREIGN PATENT DOCUMENTS

| JP | 05-213260 | 8/1993 |
| JP | 2003-306189 | 10/2003 |

(Continued)

OTHER PUBLICATIONS

International Search Report Dated Feb. 19, 2013 From the Korean Intellectual Property Office Re. Application No. PCT/KR2012/006634.

*Primary Examiner* — Henry Liu

(57) ABSTRACT

According to the present invention, an asymmetric elliptical chain gear (10) is characterized by having a shape formed by a combination of: a first ellipse (1) the major axis of which is located on the X-axis of a vertical coordinate system and the minor axis of which is located on the Y-axis of the vertical coordinate system; a first straight line (3) which is perpendicular to the minor axis, and which intersects the first ellipse (1); and a second ellipse (2) which exists on the first straight line (3) and which passes first inflection points (A, A') that form a fixed angle (a) with respect to the minor axis in the clockwise direction, and which contacts ellipse contact points (B, B') on the first ellipse (1) that are located at points forming a fixed angle (b) in the clockwise direction. The asymmetric elliptical chain gear (10) of the present invention has a shape formed by a combination of a straight line section ranging from a second reflection point (C), which is a cross point between the first straight line (3) and the first ellipse (1), to the first inflection point (A); a second ellipse section ranging from the first inflection point (A) to the ellipse contact point (B); and a first ellipse section ranging from the ellipse contact point (B) to the second inflection point (C').

10 Claims, 11 Drawing Sheets

(51) Int. Cl.
*B62M 9/08* (2006.01)
*B62M 3/06* (2006.01)

(56) References Cited

U.S. PATENT DOCUMENTS

| | | | | |
|---|---|---|---|---|
| 3,752,035 | A * | 8/1973 | Cozzy et al. | 89/13.05 |
| 3,899,932 | A * | 8/1975 | Durham | 474/141 |
| 4,865,577 | A * | 9/1989 | Freudenstein | 474/141 |
| 5,492,390 | A * | 2/1996 | Kugelmann, Sr. | 301/5.1 |
| 5,549,314 | A * | 8/1996 | Sassi et al. | 280/259 |
| 5,611,744 | A * | 3/1997 | Shen | 474/141 |
| 5,772,546 | A * | 6/1998 | Warszewski | 474/50 |
| 5,882,025 | A * | 3/1999 | Runnels | 280/259 |
| 6,487,933 | B2 * | 12/2002 | Orioli et al. | 74/594.3 |
| 7,044,875 | B2 * | 5/2006 | Gajewski | 474/148 |
| 7,125,356 | B2 * | 10/2006 | Todd | 474/152 |
| 7,749,117 | B2 * | 7/2010 | Carrasco Vergara | 474/152 |
| 7,857,720 | B2 * | 12/2010 | Lacy | 474/141 |
| 8,342,993 | B2 * | 1/2013 | Gajewski | 474/141 |
| 2003/0083165 | A1 * | 5/2003 | Hessberger | 474/141 |
| 2003/0104886 | A1 * | 6/2003 | Gajewski | 474/87 |
| 2006/0035738 | A1 * | 2/2006 | Bogner et al. | 474/141 |
| 2006/0211529 | A1 * | 9/2006 | Vergara | 474/152 |
| 2007/0010362 | A1 * | 1/2007 | Bogner et al. | 474/141 |
| 2010/0041501 | A1 * | 2/2010 | Rettig et al. | 474/141 |
| 2010/0160100 | A1 * | 6/2010 | Gajewski | 474/141 |

FOREIGN PATENT DOCUMENTS

| | | |
|---|---|---|
| KR | 10-2011-0039195 | 4/2011 |
| WO | WO 2013/027996 | 2/2013 |

\* cited by examiner

ASYMMETRIC ELLIPTICAL CHAIN GEAR FOR A BICYCLE

CROSS-REFERENCE TO RELATED APPLICATIONS

This application is a National Phase of PCT Patent Application No. PCT/KR2012/006634 having International filing date of Aug. 21, 2012, which claims the benefit of priority of Korean Patent Application No. 10-2011-0083899, filed on Aug. 23, 2011. The contents of the above applications are all incorporated by reference as if fully set forth herein in their entirety.

TECHNICAL FIELD

The present invention relates to an asymmetric elliptical chain gear of a bicycle, and more particularly, to an asymmetric elliptical chain gear of a bicycle that can improve a driving output and traveling efficiency of the bicycle and enhance consistency of a human body resistance feeling by enhancing acceleration of the bicycle by increasing a distance between a crankshaft and a is chain at a segment in which a force applied to a pedal increases and by enabling a crank to rotate even with a small force by decreasing a distance between a crankshaft and a chain at a segment in which a force applied to a pedal decreases in consideration that a force applied to the pedal by a human body is changed according to a position of the crank.

BACKGROUND ART

A shape of a general chain gear (or a sprocket) is a circle. A circular chain gear is easily produced and is thus generally much used. While a person rides and travels a bicycle, a force applied to a pedal is changed according to a position of a crank arm. That is, when a chain contacts with the shortest side, if the crank arm forms an angle of 30°-45° from a seat tube to which a saddle is coupled, a force ergonomically applying to the pedal extremely decreases, and if the crank arm forms an angle of about 165° from a seat tube, traveling inertia of the bicycle, angular acceleration of the crank, and ergonomics are combined and thus the crank arm is positioned at the longest side that may generate a largest force. Because such an ergonomical principle is not considered in a circular chain gear, traveling efficiency of the is bicycle is deteriorated.

In order to solve a problem, elliptical chain gears of several forms have been produced. Elliptical gears known up to now are greatly divided into a symmetrical elliptical gear and an asymmetrical elliptical gear. In a presently disclosed symmetrical elliptical gear, there is a merit that the elliptical gear can be easily produced, but at a partial segment in which a large force should be applied, as a gap between a crankshaft and a chain reduces, there is a defect that traveling efficiency decreases and shaking occurs and gear shifting is not smooth. In an existing asymmetric elliptical gear, such a problem can be somewhat solved, compared with a symmetrical elliptical gear, but it is not easy to produce the asymmetric elliptical gear and thus there is a defect that a production cost increases and an ergonomical principle is not accurately reflected, whereby the asymmetric elliptical gear still has a conventional problem.

U.S. Pat. No. 5,549,314 has a simple circular arc trajectory, which is a constant value at an angle 107° to 143° based on the shortest side, as shown in FIG. 8a, and a crank forms approximately 18° from the shortest side and thus when a chain contacts with the shortest side, a crank is positioned at a point in which a position of a saddle and a position of the crank correspond.

In U.S. Pat. No. 5,549,314, a crank position is formed by applying a is mathematical driving dead point concept, which is the hip joint center instead of a human body driving dead point concept formed with a hip joint, a knee joint, and an ankle joint, FIG. 8a illustrates a dead point position and FIG. 8b illustrates forming of the longest side, which is a maximum output segment, and a configuration of 107° is formed by adding traveling inertia that adds about 20° to a general angle 18° of a seat tube, an angle of less than 90°, which is a characteristic of a tangent, and a maximum output point.

U.S. Pat. No. 7,749,117 enables a dead point at which a chain is positioned at the shortest side to form an angle 30°-45° from a saddle using an accurate human body driving dead point concept, which is the knee joint center, as shown in FIG. 6a with a symmetrical elliptical gear, as shown in FIG. 9b and enables a maximum output segment to be positioned in an angle of 120°-130° from a saddle.

In U.S. Pat. No. 7,749,117, as the longest side, which is a maximum output segment is positioned in an angle of 120°-130° from a saddle, in the present invention, a position of the longest side, which is a substantial human body maximum output segment that applies acceleration and inertia is much short of an angle 165° from the saddle and an OCP system for overcoming this becomes a means that recognizes a limitation of a symmetrical gear.

As shown in FIG. 9d, in U.S. Pat. No. 5,549,314, even if a crank is angle is applied to a human body driving dead point, an angle between a longest side start point and a saddle becomes about 140°, and after the chain enters the longest side, h should reduce, and a human body resistance feeling becomes momentary damage at a constant value D segment, as shown in FIG. 10b, and a human body resistance feeling instantaneously rises so that a crank movement bottom dead point occurs.

The present invention provides an asymmetric elliptical gear that enables a constant value, which is a circular arc trajectory at the crank center that does not exist in a human body movement and a wrong dead point position of U.S. Pat. No. 5,549,314 not to exist and that enables a saddle to constantly maintain sensible resistance of a human body from 11 o'clock to 6 o'clock in a general bicycle of about an angle 18°, as shown in FIG. 9a by enabling to be adjacent to 135° instead of angle 90° between then long side and the short side, which is an insufficient congestion segment in U.S. Pat. No. 7,749,117.

DETAILED DESCRIPTION OF INVENTION

Technical Problem

The present invention has been made in view of the above problems, and provides an asymmetric elliptical gear that determines a shape of an elliptical gear with a combination of a straight line and two ellipses similar to is verticality and that enhances traveling efficiency and enables soft traveling and an easy design and in which a principle of human body dynamics is reflected to the maximum by increasing a distance between a crankshaft and a chain at a segment to which a large force is applied and by reducing a distance between a crankshaft and a chain at a segment to which a small force is applied.

As shown in FIG. 10a, when a shaft length angle a is lowered, an ellipse parallel to a similar angle is formed, and an angle a between the longest side and the shortest side may be less than 90°, and as shown in FIG. 10b, a circle contacting with a first ellipse of an angle b may be formed with setting of the angle a, and in this case, it is difficult for an angle between the longest side and the shortest side to overpass 120°, and as shown in FIG. 10c, when the angle a is large, a vertical second ellipse is formed in an angle similar to the first ellipse, and in this case, an angle between the longest side and the shortest side can easily overpass 120°.

Technical Solution

It is characterized in that an asymmetric elliptical chain gear according to the present invention has a shape formed with a combination of a first ellipse 1 whose major axis is positioned on an X-axis of a vertical coordinate system and whose minor axis is positioned on a Y-axis, a first is straight line 3 vertical to the minor axis and intersecting the first ellipse 1 and a second ellipse 2 existing on the first straight line 3 and passing through first inflection points A and A' positioned at a point forming a constant angle a clockwise of the minor axis and contacting with elliptical contact points B and B' on the first ellipse 1 positioned at a point forming a constant angle b clockwise at the major axis, but has a shape formed with a combination of a straight line segment from a second inflection point C, which is an intersection of the first straight line 3 and the first ellipse 1 to the first inflection point, a second elliptical segment from the first inflection point A to the elliptical contact point B, and a first elliptical segment from the elliptical contact point B to the second inflection point C'.

In this case, it is characterized in that an angle c formed by the second inflection points C and C' and the minor axis is designed to be not larger than an angle a formed by the first inflection points A and A' and the minor axis, and in FIG. 11c, as an angle c increases, a resistance feeling of a movement start point increases, and as shown in FIG. 11a, as an angle c decreases, a resistance feeling of a movement start point is lowered.

Further, it is characterized in that the angle a is 10° to 35°, and when an axis length angle a of FIG. 10a is lowered, an ellipse parallel to a similar angle is formed, and a angle between the longest side and the shortest is side may be less than 90°, as shown in FIG. 10b, a circle contacting with a first ellipse of an angle b with setting of an angle a may be formed, and in this case, it is difficult for an angle between the longest side and the shortest side to overpass 120°, and as shown in FIG. 10c, when the angle a is large, a vertical second ellipse is formed in a angle similar to that of the first ellipse, and in this case, an angle between the longest side and the shortest side can easily overpass 120°.

Further, it is characterized in that the angle b is 0° to 15°, and in FIG. 11b, when the angle b is 0, a phenomenon in which a human body resistance feeling temporarily decreases occurs and an angle between the long side and the short side increases, and as the angle b increases, a congestion segment of resistance increases and an angle between the long side and the short side decreases.

It is characterized in that a wide and narrow form of gear interteeth clearances of an asymmetric elliptical chain gear according to the present invention is repeatedly formed. In this case, it is characterized in that an index groove is formed at wide gear interteeth clearance of gear interteeth clearances of the asymmetric elliptical gear.

Further, it is characterized in that at least one latch rivet is coupled to a side surface portion adjacent to gear teeth of a far location from the center is of the asymmetric elliptical chain gear.

An asymmetric elliptical chain gear according to the present invention is characterized in that a guard frame having a constant thickness is further coupled to one side surface of the asymmetric elliptical gear.

Advantageous Effects

According to the present invention, inefficiency of a symmetrical elliptical gear is overcome, efficiency of the elliptical gear is maximized in consideration of a movement characteristic of a human body and a special situation such a dancing traveling, traveling inertia, and angular acceleration of a crank, and while minimizing an inefficient segment according to a rotation position of the elliptical gear, a problem of a narrow shifting segment in which the symmetrical elliptical gear has can be overcome.

Further, the present invention has a merit that enables an NC processing to be available by providing a design reference of the asymmetric elliptical chain gear and that enables an easy design of an elliptical gear of various forms appropriate to use of a bicycle.

As shown in FIG. 11a, unlike a case of setting of a general angle a and angle b of the present invention, as shown in FIG. 11b, when the angle b is is 0, an instant decrease segment of a human body resistance feeling exists, in such a case, the instant decrease segment should be applied to unpaved uphill traveling use of a mountain bicycle, and as shown in FIG. 11c, when an angle c is large, if a cleat pedal is used, a force pulling an opposite pedal is added. Therefore, the angles a, b, and c should be in a level that can be organically applied to an use environment of the bicycle and an angle between the long side and the short side may be applied to a range that does not deviate from 115°-135°.

As described above, the present invention may provide various asymmetric elliptical gears according to a use environment in a predetermined range of an angle between the long side and the short side.

DESCRIPTION OF SYMBOLS

Figure 1:
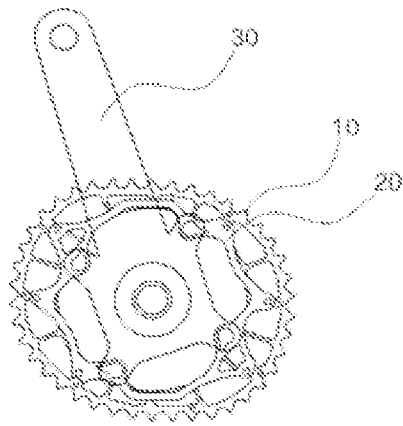
FIG. 1 is a front view illustrating an asymmetric elliptical chain gear coupled to a crank according to an exemplary embodiment of the present invention.

1: first ellipse 2: second ellipse
3: first straight line 10: asymmetrical elliptical chain gear
12: index groove 13: latch rivet
20: guard frame 30: crank arm
40: seat tube
A, A': first inflection point B, B': elliptical contact point
C, C': second inflection point
I: straight line segment J: second elliptical segment
K: first elliptical segment

BEST MODES FOR CARRYING OUT THE INVENTION

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention.

Hereinafter, an asymmetric elliptical chain gear 10 according to an is exemplary embodiment of the present invention will be described with reference to FIGS. 1 to 6.

Figure 2:
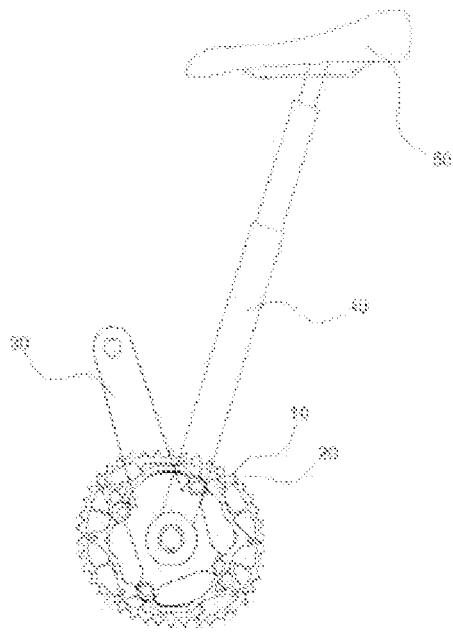
FIG. 2 is a front view illustrating a mounted asymmetric elliptical chain gear according to an exemplary embodiment of the present invention.
Figure 3:
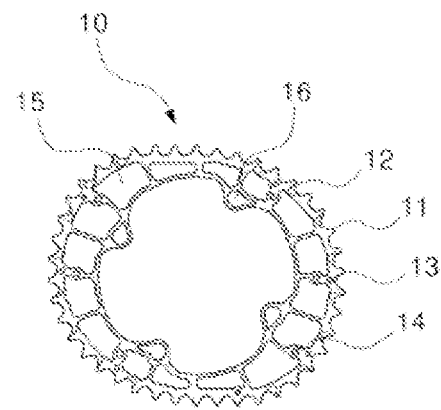
FIG. 3 is a front view illustrating an asymmetric elliptical chain gear according to an exemplary embodiment of the present invention.
Figure 4:
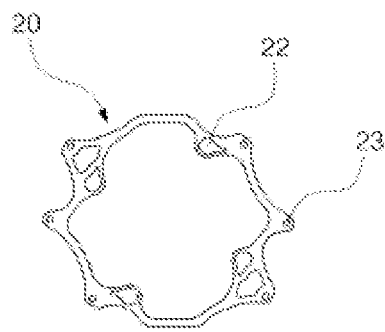
FIG. 4 is a front view illustrating a guard frame of an asymmetric elliptical chain gear according to an exemplary embodiment of the present invention.
Figure 5:
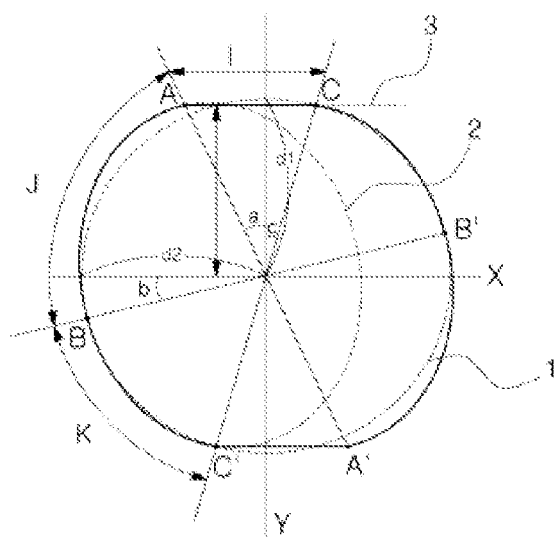
FIG. 5 is an explanatory diagram determining a shape of an asymmetric elliptical chain gear according to an exemplary embodiment of the present invention.

FIGS. 1 and 2 are front views illustrating a mounted asymmetric elliptical chain gear 10 according to an exemplary embodiment of the present invention, and FIG. 5 is an explanatory diagram determining a shape of the asymmetric elliptical chain gear 10 according to an exemplary embodiment of the present invention.

Referring to FIG. 5, it is characterized in that the asymmetric elliptical chain gear 10 according to an exemplary embodiment of the present invention has a shape formed with a combination of a first ellipse 1 whose major axis is positioned on an X-axis of a vertical coordinate system and whose minor axis is positioned on a Y-axis, a first straight line 3 vertical to the minor axis and intersecting the first ellipse 1, and a second ellipse 2 existing on the first straight line 3 and passing through first inflection points A and A' positioned at a point forming a constant angle a clockwise of the minor axis and contacting with elliptical contact points B and B' on the first ellipse 1 positioned at a point forming a constant angle b clockwise at the major axis, but has a shape formed with a combination of a straight line segment I from a second inflection point C, which is an intersection of the first straight line 3 and the first ellipse 1 to the first inflection point A, a second elliptical segment J from the first inflection point A to is the elliptical contact point B, and a first elliptical segment K from the elliptical contact point B to a second inflection point C'.

The vertical coordinate system is introduced, for convenience, to clearly describe a principle in which a shape of an asymmetric elliptical chain gear according to the present invention is determined and resultantly, an asymmetric elliptical chain gear having the same or similar shape belongs to the scope of the present invention. Further, a term "elliptical shape" is a concept including a shape similar to an ellipse and does not mean a mathematical ellipse.

Referring to FIG. 5, there is no limitation in eccentricity of the first ellipse 1, but it is preferable that eccentricity is determined to a value between about 1.05 to 1.25. If eccentricity is excessively adjacent to 1, the asymmetric elliptical chain gear does not have a performance difference from a circular gear, and if eccentricity is excessively large, it is difficult to shift a gear, and while traveling, a shaking problem may occur. When the first ellipse 1 is determined, the first straight line 3 parallel to a major axis or vertical to a minor axis and in which a distance H from a starting point is smaller than or equal to a length dl of the short side is determined. In order to prevent a straight line segment of an elliptical gear from being excessively long, at a point in which a distance H from a starting point is adjacent to a length dl of the short side, the first straight is line 3 is determined. An intersection point between the straight line 3 and the first ellipse 1 is defined as the second inflection point C. A point positioned on the first straight line 3 and forming a constant angle a clockwise about the starting point and the minor axis is defined as a first inflection point A. In this case, it is preferable that the angle a is determined between 10° to 35°. If the angle a is excessively large, while a straight line segment of the elliptical gear is excessively extended, a shape of the elliptical gear may be greatly distorted, and if the angle a is excessively small, the asymmetric elliptical chain gear has no difference from a symmetrical elliptical gear. A point forming a constant angle b clockwise from a major axis or an X-axis and positioned on the first ellipse 1 is defined as an elliptical contact point B. It is preferable that the angle b is determined between 0° to 20°.

The second ellipse 2 passing through the first inflection point A and contacting with the first ellipse 1 at the elliptical contact point B is determined. In this way, when the first ellipse 1, the second ellipse 2, and the first straight line 3 are determined, as shown in FIG. 5, a pair of first to second inflection points C and C' are determined, and a shape of an asymmetric elliptical chain gear according to an exemplary embodiment of the present invention is determined with a straight line segment I that connects the point C and the point A, a second elliptical segment J that connects the point A and the point B, a first is elliptical segment K that connects the point B and the point C', a straight line segment that connects again the point C' and the point A', a second elliptical segment that connects the point A' and the point B', and a first elliptical segment that connects the point B' and the point C.

In this case, it is preferable that an angle c formed by the second inflection points C and C' and the minor axis is designed to be not larger than an angle a formed by the first inflection points A and A' and the minor axis.

It is preferable that a wide and narrow form of gear interteeth clearances of the asymmetric elliptical chain gear 10 according to the present invention is repeatedly formed. In an elliptical chain gear, because a force operating between a chain gear and a chain is not constant unlike a circular gear, by repeating a wide and narrow form of a gear interteeth clearance, it is preferable to enhance close contact between the chain gear and the chain. In this case, at a first elliptical segment and a second elliptical segment of the asymmetric elliptical gear, by forming an index groove 12 at a wide gear interteeth clearance of gear interteeth clearances, it is preferable that the chain more softly receives a force by the chain gear and is naturally shifted.

The asymmetric elliptical chain gear 10 according to the present invention is characterized in that at least one latch rivet 13 is coupled to a side surface portion adjacent to a gear tooth of a far distance from the center of the is asymmetric elliptical chain gear. The latch rivet 13 is latched to a chain upon shifting to perform a function of assisting to naturally shift a gear. It is preferable that the latch rivet 13 is coupled at a distance far from the center of a chain gear having a large possibility that shifting is not to be smoothly performed.

Further, it is preferable that the latch rivet is formed at a wide interteeth clearance.

The asymmetric elliptical chain gear according to the present invention is characterized in that a guard frame 20 having a constant thickness is further coupled to one side surface of the asymmetric elliptical gear. The guard frame 20 performs a function of preventing a chain from being inserted between chain gears while reinforcing strength of the chain gear.

Operation according to a rotation of an asymmetric elliptical chain gear according to the present invention will be described with reference to FIGS. 6a to 6f.

FIGS. 6a to 6f are operation explanatory diagrams illustrating a dynamic relationship according to a position change of a chain gear.

Figure 6A:
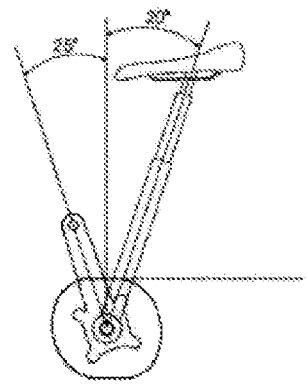
FIGS. 6a-6g are operation explanatory diagrams illustrating a dynamic relationship according to a rotation of a chain gear.

In FIG. 6a, when a chain contacts with the shortest side, an angle between a crank arm 30 and a seat tube 40 becomes about 30-45° and becomes a start point of a movement. In this state, the chain is put at a straight line segment of the chain gear or a distance between the chain and a is crankshaft becomes shortest. At a start point of a movement, because it is difficult to apply a large force to the pedal, the chain is put at the shortest side so as to drive the bicycle with even a small force.

Figure 6B:
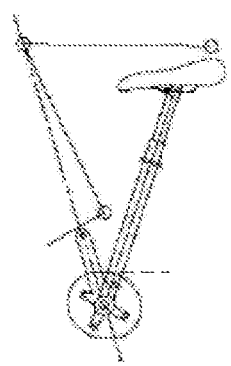

FIG. 6b illustrates a state in which an angle between the crank arm and the seat tube forms about 90°. In this case, because a state that can ergonomically apply a relatively strong force to the pedal is formed, in a state shown in FIG. 6a, a distance between the chain and the crankshaft is extended and the bicycle is gradually accelerated.

Figure 6C:
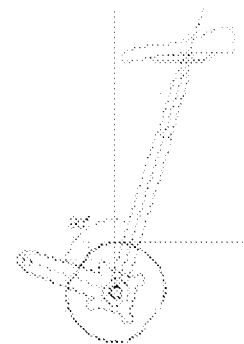

FIG. 6c illustrates the crank arm in a state almost horizontal to the ground. This point is a point in which acceleration is actively performed further than the point shown in FIG. 6b and is in a state that can apply a relatively strongest force to the pedal. This is a segment in which a distance between a chain and a crankshaft is extended further than a segment in a state shown in FIG. 6b.

Figure 6D:
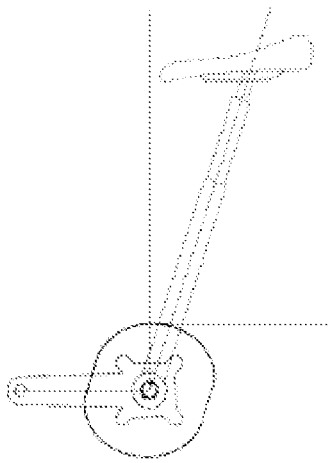
Figure 6G:
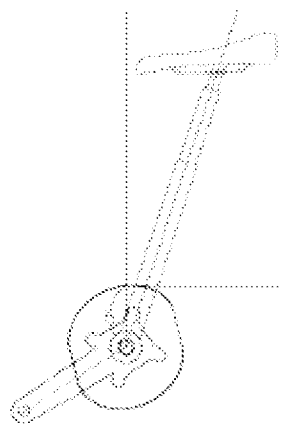

FIG. 6d illustrates a state in which the chain gear and the crank arm are rotated further than a state shown in FIG. 6c. A force applied to the pedal is gradually weakened while passing through this time point. This point is not a point in which a force applied to the pedal is a maximum, but for the above-described process, in consideration of inertia increased by acceleration, this point is a point in which a largest resistance force is applied to the chain and an is angle from the saddle is about 135°-170°. Therefore, at this point, a distance between the crankshaft and the chain becomes a maximum h, and after this point, a distance between the chain and the crankshaft gradually decreases.

In a conventional symmetrical elliptical gear, before this point, a distance between a chain and a crankshaft is shortened and thus a resistance force applied to the chain greatly decreases and thus while traveling, a shaking phenomenon occurs and a force applied by a human body is not applied to the maximum and thus inefficient driving occurs. Particularly, in dancing traveling, which is traveling in a state in which a hip is separated from a seat, in the conventional symmetrical elliptical gear, a serious shaking phenomenon occurs.

Figure 6E:
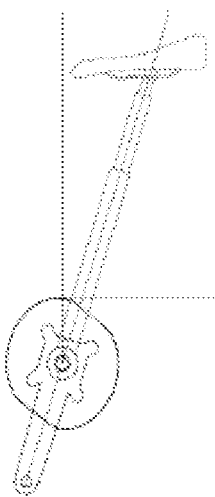
Figure 6F:
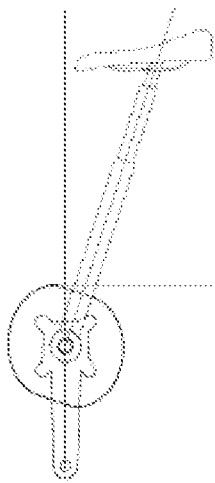
Figure 9A:
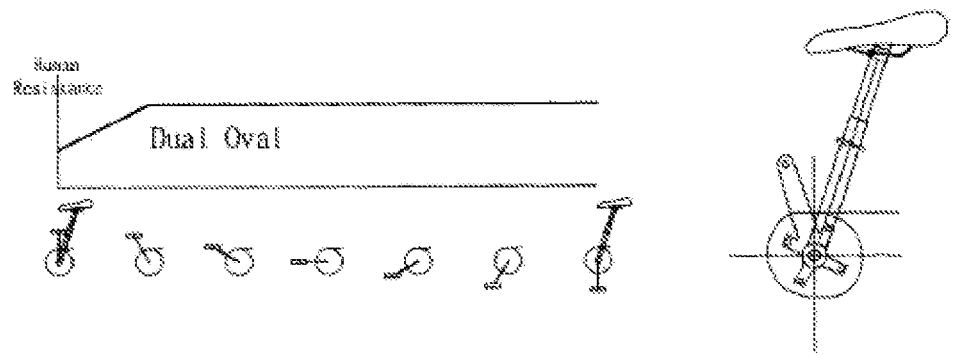
FIGS. 9a to 9d are explanatory diagrams illustrating a human body resistance feeling according to a rotation of a chain gear of the present invention and U.S. Pat. No. 5,549,314 and No. 7,749,117.
Figure 9B:
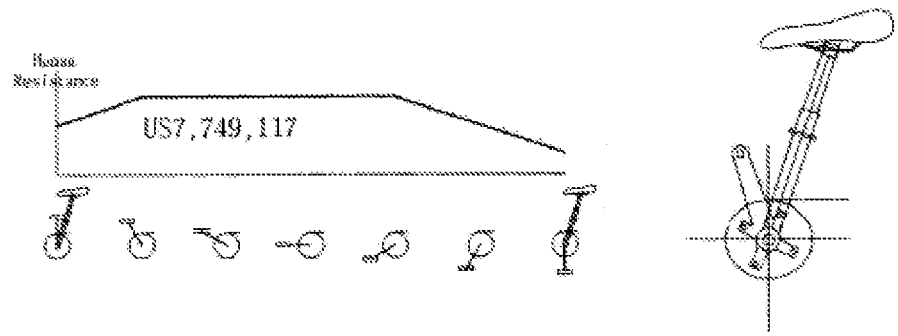
Figure 9C:
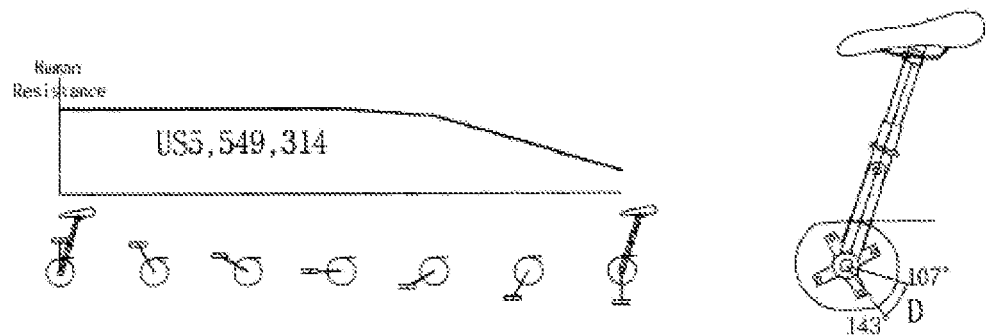
Figure 9D:
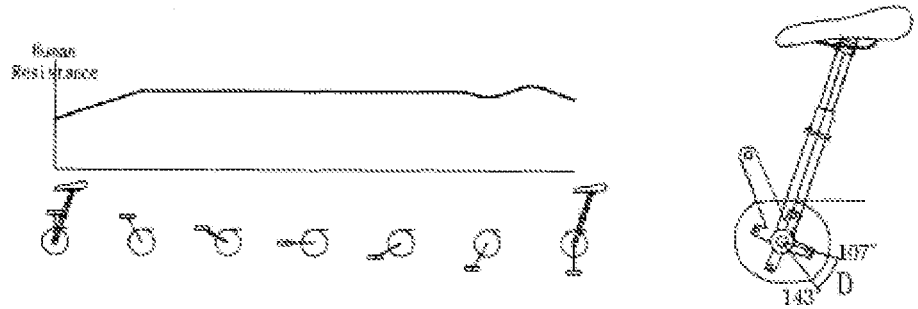
Figure 10A:
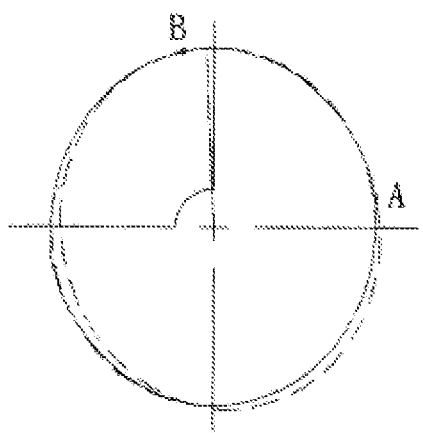
FIGS. 10a to 10c are explanatory diagrams illustrating a basic factor of a first ellipse and a second ellipse according to an exemplary embodiment of the present invention.
Figure 10B:
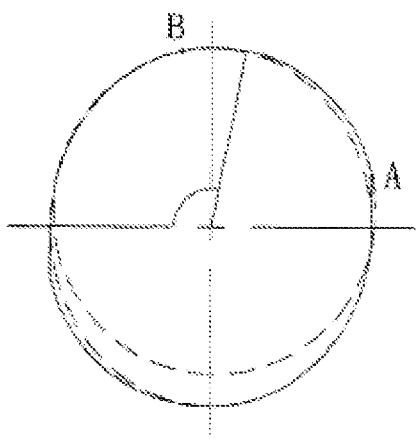
Figure 10C:
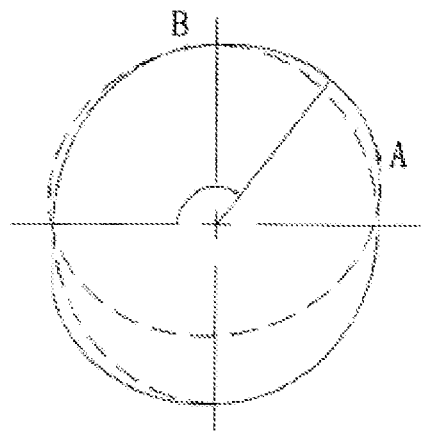
Figure 11A:
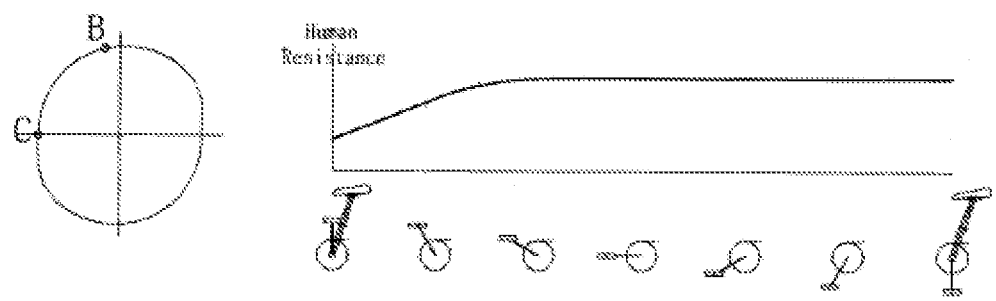
FIGS. 11a to 11c are explanatory diagrams illustrating a human is body resistance feeling according to injection of various elements according to an exemplary embodiment of the present invention.
Figure 11B:
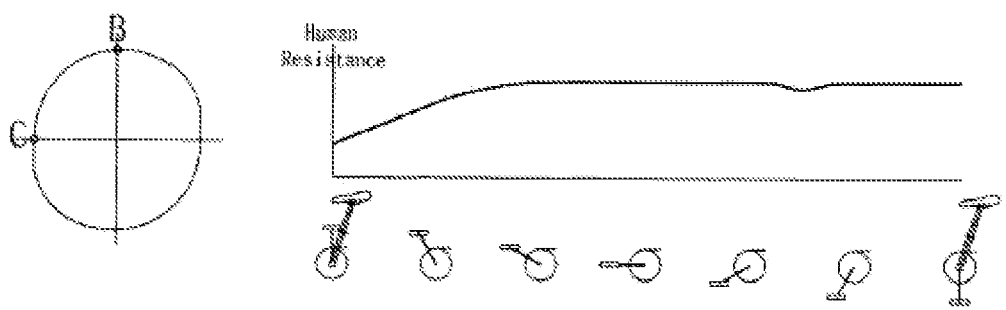
Figure 11C:
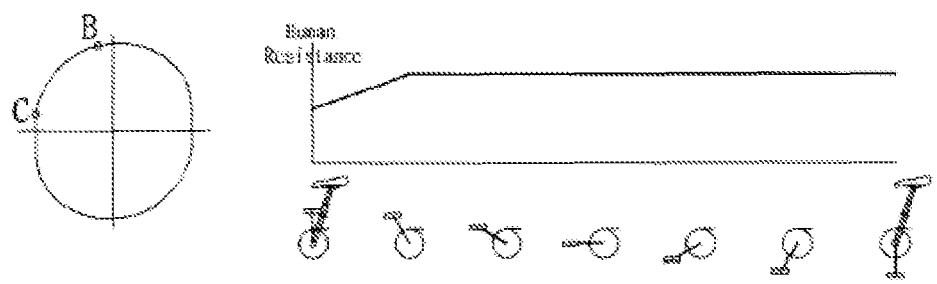

As advancing from a state of FIG. 6e to a state of FIG. 6f, because a force applying to the pedal greatly decreases, a distance between the crankshaft and the chain is rapidly shortened and thus the pedal may be driven by even a small force. As shown in FIG. 9d, in U.S. Pat. No. 5,549,314, when the chain contacts with the shortest side, if an angle between the saddle and the crank is 30°-45°, due to a constant value D segment, which is a circular arc trajectory, as shown in FIG. 10b, a bottom dead point in which damage of a human body resistance feeling instantaneously occurs and in which request resistance of the human body immediately rapidly increases may exist.

Figure 7:
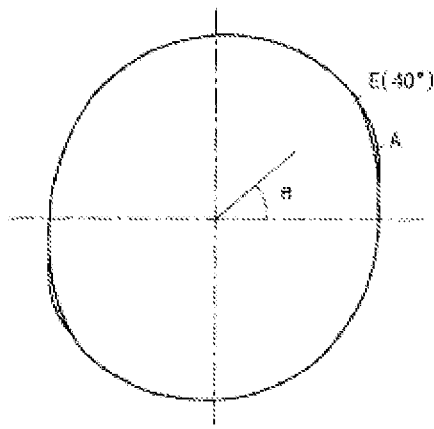
FIGS. 7a-7b are additional explanatory diagrams determining a shape of an asymmetric elliptical chain gear according to an exemplary embodiment of the present invention.
Figure 7B:
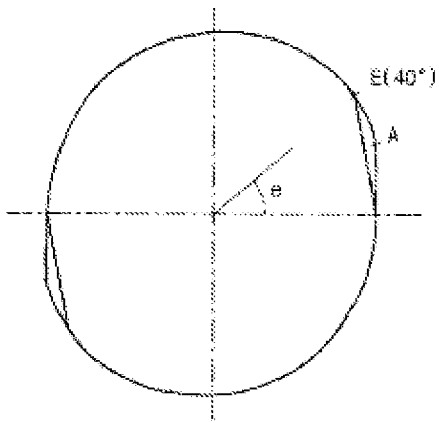
Figure 8A:
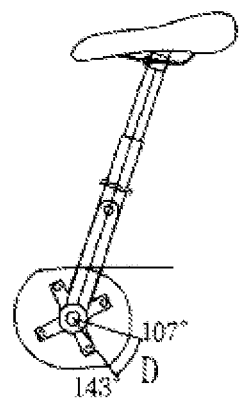
FIGS. 8a to 8c are operation explanatory diagrams illustrating a dynamic relationship according to a rotation in U.S. Pat. No. 5,549,314.
Figure 8B:
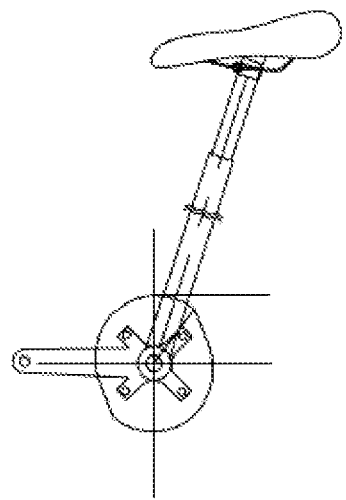
Figure 8C:
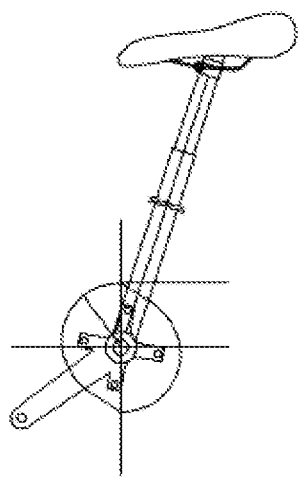

As shown in FIG. 7, in consideration of shifting, chain separation, and mounting of a crank arm in BCD, when an angle e is 30° to 40° and the angle a is less than 35°, in an angle e, a straight line or an ellipse that removes the first inflection point A may be inserted. Bicycle traveling is repeated with such a principle.

In the foregoing description, an asymmetric elliptical chain gear of a bicycle according to the present invention is designed in consideration of all of a magnitude of a force ergonomically applied to a pedal, angular acceleration of the crank, and traveling inertia of the bicycle and enables a person having a constant movement ability to perform soft traveling while exhibiting a maximum output.

The invention claimed is:

1. An asymmetric elliptical gear having a shape formed with a combination of an ellipse and a straight line, wherein the asymmetric elliptical gear has a shape formed with a combination of a first ellipse (1) whose major axis is positioned on an X-axis of a vertical coordinate system and whose minor axis is positioned on a Y-axis, a first straight line (3) vertical to the minor axis and intersecting the first ellipse (1), and a second ellipse (2) existing on the first straight line (3) and passing through first inflection points (A) and (A') positioned at a point forming a constant angle a clockwise of the minor axis and contacting with elliptical contact points (B) and (B') on the first ellipse (1) positioned at a point forming a constant angle b clockwise at the major axis, but has a shape formed with a combination of a straight line segment from a second inflection point (C), which is an intersection of the first straight line (3) and the first ellipse (1) to the first inflection point (A), a second elliptical segment from the first inflection point (A) to the elliptical contact point (B), and a first elliptical segment from the elliptical contact point (B) to the second inflection point (C').

2. The asymmetric elliptical gear of claim 1, wherein an angle (c) formed by the second inflection points (C) and (C') and the minor axis is not larger than an angle a formed by the first inflection points (A) and (A') and the minor axis.

3. The asymmetric elliptical gear of claim 1, wherein the angle (a) is 10° to 35°.

4. The asymmetric elliptical gear of claim 3, wherein in an angle (e), a straight line or an ellipse that removes the first inflection point A is inserted, and the angle (e) is 30° to 40°, when the angle (a) is less than 35°.

5. The asymmetric elliptical gear of claim 1, wherein the angle (b) is 0° to 20°.

6. The asymmetric elliptical gear of claim 1, wherein interteeth clearances of the asymmetric elliptical gear are repeatedly formed in a wide and narrow form.

7. The asymmetric elliptical gear of claim 6, wherein at a wide interteeth clearance of interteeth clearances of the asymmetric elliptical gear, an index groove is formed.

8. The asymmetric elliptical gear of claim 6, wherein at least one latch rivet is coupled to a side surface portion adjacent to a gear tooth of a location far from the center of the asymmetric elliptical gear, and the latch rivet is positioned at a wide interteeth clearance.

9. The asymmetric elliptical gear of claim 1, wherein at one side surface of the asymmetric elliptical gear, a guard frame having a constant thickness is further coupled.

10. The asymmetric elliptical gear of claim 7, wherein at least one latch rivet is coupled to a side surface portion adjacent to a gear tooth of a location far from the center of the asymmetric elliptical gear, and the latch rivet is positioned at a wide interteeth clearance.

* * * * *